H. O. V. BERGSTRÖM.
METHOD OF PRODUCTION OF CALCIUM BISULFITE LIQUOR.
APPLICATION FILED SEPT. 25, 1914.

1,159,352.  Patented Nov. 9, 1915.

UNITED STATES PATENT OFFICE.

HILDING OLOF VIDAR BERGSTRÖM, OF STOCKHOLM, SWEDEN.

METHOD OF PRODUCTION OF CALCIUM-BISULFITE LIQUOR.

1,159,352.   Specification of Letters Patent.   Patented Nov. 9, 1915.

Application filed September 25, 1914. Serial No. 863,492.

*To all whom it may concern:*

Be it known that I, HILDING OLOF VIDAR BERGSTRÖM, civil engineer, subject of the King of Sweden, residing at Kungsklippan 17$^a$, Stockholm, in the Kingdom of Sweden, have invented certain new and useful Improvements in Methods of Production of Calcium-Bisulfite Liquor.

The vapors from a sulfite boiler contain, as is well known, sulfur dioxid, which at present is usually turned to account by passing these vapors, or their product of condensation, into the so called acid bins containing ready-made calcium bisulfite, (the acid liquor used in the boiling process) when the latter is enriched with the amount of sulfur dioxid contained in the vapors. As however these vapors contain considerable quantities of impurities, the calcium bisulfite is thus greatly befouled, which may entail some trouble in the boiling process itself.

The present invention purposes in the production of calcium bisulfite for the manufacture of sulfite cellulose to turn to account the sulfur dioxid contained in said vapors, as well as several other substances, such as oil, alcohol etc., removing the impurities occurring in the vapors to a greater or lesser extent. The calcium bisulfite, produced according to the present invention, is therefore purer than has hitherto been the case.

The method of procedure is mainly based upon the fact that the vapors are condensed, and then by one or more operations the sulfur dioxid is separated from the impure product of condensation, which is drawn off, and the sulfur dioxid turned into use in the process, *e. g.* by passing the same into the acid tower where the calcium bisulfite is being produced, or into the ready made calcium bisulfite, and so on.

The manner of carrying out this method becomes apparent from the description below of the system of apparatus diagrammatically shown on the accompanying drawing.

Figure 1:
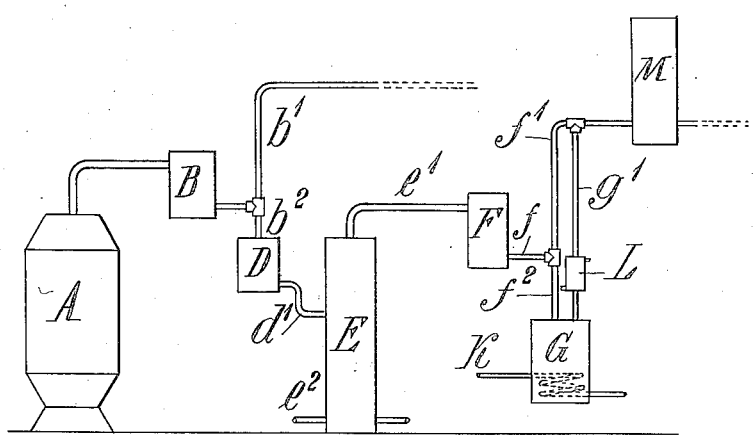
Figure 2:
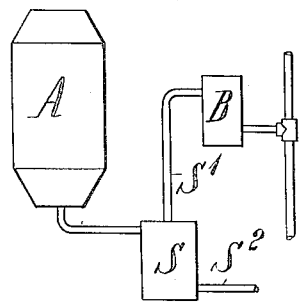

Figure 1 is a diagrammatic view of the apparatus suitable for carrying out the method, and Fig. 2 is a partial diagrammatic view of a modification.

The vapors issuing from the boiler A (Fig. 1) are condensed in the usual manner in the cooler B, preferably after they have passed a tank for the purpose of ridding them of any accompanying moisture or liquid. From the cooler the sulfur dioxid issues through the pipe $b^1$, in order to be again turned to use in the process, *e. g.* by being run into the acid towers (not shown) or into the acid bins and so on. From the cooler B there issues furthermore into the tank D through the pipe $b^2$, the product of condensation formed in the cooler B, and this product of condensation generally contains sulfur dioxid. This product of condensation is run from the tank D, through the pipe $d^1$, to an apparatus for expelling the sulfur dioxid and other volatile substances, which device might properly be a column apparatus E, in which it is allowed in the usual manner to run down in the opposite direction to the steam which is coming from below. The steam expels then the sulfur dioxid together with some organic substances, such as oil, etc. This vaporous mixture may now either be run direct into the process, or as is shown in the drawing, through the pipe $e^1$ transmitted to the cooler F. The product of condensation which has been purified of sulfur dioxid and other substances, and which contains some impurities, is drawn off from the column-apparatus through the pipe $e^2$. The product of condensation, formed in the cooler F as well as vaporous sulfur dioxid pass off through the pipe $f$, from which the sulfur dioxid continues through the pipe $f^1$, in order to be turned to account in the process, *e. g.* in the acid towers or acid bins, while the liquid product of condensation generally containing $SO_2$ passes down into a tank G. This latter is adapted for heating *e. g.* by means of a spiral tube K, through which the steam passes, and as the result of this heating, the sulfur dioxid is expelled, and may through the pipe $g^1$ be turned into the process. In order to prevent other volatile substances from escaping with the sulfur dioxid from the tank G, a return-flow cooler L, or some similar device may be connected with the pipe $g^1$. The product of condensation left in the tank G can then be treated for extracting one or more of the organic products contained in the same. It is advisable to combine with the tank G an oil separator, so that the greater part of the oil is removed when the product of condensation comes into the tank G.

The sulfur dioxid coming from the pipe $f^1$ can usually not be run direct either into the acid towers or into the acid bins, as then a varying counter pressure may easily occur in the column-apparatus. On account of this it is advisable to run the same into a separate absorption device, e. g. into a tower M filled with coke, where the $SO_2$ is absorbed. This solution is made use of then in the process of manufacture, e. g. by being run into the acid bin.

In such cases where the mixture at the end of a boiling process is being expelled from the boiler with the aid of the pressure in the same, the present principle may also be made use of. In this connection the method of procedure may for example be such as will be seen from Fig. 2, according to which the pulp mass and the liquor from the boiler A are turned into the tank S, from which the vapors issue through the pipe $S^1$ into a cooler B, after which the process is the same as according to Fig. 1.

It is evident that the system of apparatus shown and the description of the method of procedure with the same are only illustrative, and merely intended to explain the course of the process in the main. In practical use there are therefore to be added some items and detail devices not given here, as they have nothing to do with the characteristics of the invention. The product of condensation may for example, before being taken into the expulsion device, by heating the same or by the addition of $SO_2$ neutralizing matter, etc., be more or less completely ridded of $SO_2$. Even a concentrated product of the organic substances, e. g. oil and methylated spirit, may be taken out from e. g. a special department or chamber arranged for that purpose in the column, or in some other manner, when mainly $SO_2$ passes off from the expulsion device as gas. Vapors from the expulsion device may even be run through $SO_2$ neutralizing substances, when in a succeeding condensation a product of condensation more or less free from $SO_2$ is obtained. In a manner known for the column apparatus the organic substances may furthermore be obtained directly in a half or entirely pure condition from the expulsion device.

Having thus described my invention, I declare, that what I claim is:

1. The herein described method for producing calcium bisulfite in the manufacture of sulfite cellulose under utilization of the vapors from the sulfite boiler or the acid liquor, which consists in condensing the vapors from the sulfite boilers or the said acid liquor in a condensing apparatus collecting the gaseous sulfur dioxid not condensed in said condenser and reusing it in the sulfite process, introducing the condensate obtained in said condenser in an apparatus in which sulfur dioxid together with some organic substances are driven off and then reused in the sulfite process.

2. The herein described method for producing calcium bisulfite in the manufacture of sulfite cellulose under utilization of the vapors from the sulfite boiler or the acid liquor, which consists in condensing the vapors from the sulfite boilers or the said acid liquor in a condensing apparatus collecting the gaseous sulfur dioxid not condensed in said condenser and reusing it in the sulfite process, introducing the condensate obtained in said condenser in an apparatus in which sulfur dioxid together with some organic substances are driven off, and then introduced in a second condenser, leading off the sulfur dioxid from said condenser and reusing it into the sulfite process, while the condensate is led off from said condenser and collected.

3. The herein described method for producing calcium bisulfite in the manufacture of sulfite cellulose under utilization of the vapors from the sulfite boiler or the acid liquor, which consists in condensing the vapors from the sulfite boilers or the said liquor in a condensing apparatus collecting the gaseous sulfur dioxid not condensed in said condenser and reusing it in the sulfite process, introducing the condensate obtained in said condenser in an apparatus in which sulfur dioxid together with some organic substances are driven off and then introduced in a second condenser, leading off the sulfur dioxid from said condenser and reusing it in the sulfite process while the condensate is led off from the condenser and collected in a receptacle where by means of heat the sulfur dioxid contained therein, is driven off and reused in the sulfite process.

4. The herein described method for producing calcium bisulfite in the manufacture of sulfite cellulose under utilization of the vapors from the sulfite boiler or the acid liquor, which consists in condensing the vapors from the sulfite boilers or the said acid liquor in a condensing apparatus collecting the gaseous sulfur dioxid not condensed in said condenser and reusing it in the sulfite process, introducing the condensate obtained in said condenser in an apparatus in which sulfur dioxid together with some organic substances are driven off and then introduced in a second condenser, leading off the sulfur dioxid from said condenser and reusing it in the sulfite process while the condensate is led off from said condenser and collected in a receptacle where by means of heat the sulfur dioxid contained therein, is driven off leading the gases issuing from said receptacle through a return flow cooler and reusing the gases not condensed in said cooler in the sulfite process.

5. The herein described method for producing calcium bisulfite in the manufacture of sulfite cellulose, under utilization of the vapors from the sulfite boiler or the acid liquor, which consists in condensing the vapors from the sulfite boilers or the said acid liquor in a condensing apparatus collecting the gaseous sulfur dioxid not condensed in said condenser and reusing it in the sulfite process, introducing the condensate obtained in said condenser in an apparatus in which sulfur dioxid together with some organic substances are driven off, introducing the gases from said apparatus into an absorption apparatus in which sulfur dioxid is absorbed, and then reused in the sulfite process, the gases not absorbed in said absorption apparatus being condensed and collected.

6. The herein described method for producing calcium bisulfite in the manufacture of sulfite cellulose under utilization of the vapors from the sulfite boiler or the acid liquor, which consists in condensing the vapors from the sulfite boilers or the said acid liquor in a condensing apparatus collecting the gaseous sulfur dioxid not condensed in said condenser and reusing it in the sulfite process, introducing the condensate obtained in said condenser in an apparatus in which sulfur dioxid together with some organic substances are driven off, and then introduced in a second condenser, leading off the sulfur dioxid from said condenser and reusing it in the sulfite process while the condensate is led off from said condenser and collected in a receptacle where by means of heat the sulfur dioxid contained therein, is driven off, introducing the gases from said apparatus into an absorption apparatus in which sulfur dioxid is absorbed, and then reused in the sulfite process.

7. The herein described method for producing calcium bisulfite in the manufacture of sulfite cellulose, under utilization of the vapors from the sulfite boiler or the acid liquor, which consists in driving off the mass and the liquor from the boiler by the influence of the pressure in the boiler into a closed receptacle leading the gas from said receptacle into a condenser collecting the gaseous sulfur dioxid not condensed in said condenser and reusing it in the sulfite process, introducing the condensate obtained in said condenser in an apparatus in which sulfur dioxid together with some organic substances are driven off and then introduced into a second condenser, the sulfur dioxid not condensed in said condenser being reused in the sulfite process, and collecting the condensate.

8. The herein described method for producing calcium bisulfite in the manufacture of sulfite cellulose under utilization of the vapors from the sulfite boiler or the acid liquor, which consists in condensing the vapors from the sulfite boilers or the said acid liquor, treating the condensate thereby obtained in such a way, that sulfur dioxid contained therein is separated from the condensate, reusing said sulfur dioxid in the sulfite process and introducing the remaining condensate into an apparatus in which organic substances are driven off and collected.

In witness whereof I have hereunto set my hand in presence of two witnesses.

HILDING OLOF VIDAR BERGSTRÖM.

Witnesses:
 AUG. HAGELIN,
 ALMA PETEERSSON.